US011236489B2

(12) United States Patent
Chaisson et al.

(10) Patent No.: US 11,236,489 B2
(45) Date of Patent: Feb. 1, 2022

(54) APPARATUS FOR INSTALLING A LAND ANCHOR

(71) Applicant: Wilco Manufacturing, LLC, Lafayette, LA (US)

(72) Inventors: Lanny Chaisson, Lafayette, LA (US); Jake Broussard, Erath, LA (US)

(73) Assignee: Wilco Manufacturing, LLC, Lafayette, LA (US)

( * ) Notice: Subject to any disclaimer, the term of this patent is extended or adjusted under 35 U.S.C. 154(b) by 0 days.

(21) Appl. No.: 17/031,582

(22) Filed: Sep. 24, 2020

(65) Prior Publication Data

US 2021/0087790 A1    Mar. 25, 2021

Related U.S. Application Data

(60) Provisional application No. 62/905,788, filed on Sep. 25, 2019.

(51) Int. Cl.
*E02F 9/22* (2006.01)
*E02F 3/06* (2006.01)
*B60F 3/00* (2006.01)

(52) U.S. Cl.
CPC .............. *E02F 9/2203* (2013.01); *E02F 3/06* (2013.01); *E02F 9/2221* (2013.01); *E02F 9/2246* (2013.01); *E02F 9/2267* (2013.01); *E02F 9/2271* (2013.01); *E02F 9/2278* (2013.01); *B60F 3/0015* (2013.01)

(58) Field of Classification Search
CPC ...... F15B 2211/3058; F15B 2211/3127; F15B 2211/7741; F15B 13/021; E02F 9/2203; E02F 9/2278; E02F 3/06; E02F 3/78; E02F 9/2207; E02F 5/18; E02F 5/16
See application file for complete search history.

(56) References Cited

U.S. PATENT DOCUMENTS

| | | | | |
|---|---|---|---|---|
| 2,786,284 | A * | 3/1957 | Todd | E02F 3/06 37/350 |
| 4,660,649 | A * | 4/1987 | Anderson | A01B 39/166 172/125 |
| 4,911,581 | A * | 3/1990 | Mauch | E02D 5/56 173/11 |
| 5,251,705 | A * | 10/1993 | Waggoner | E02F 9/2203 172/812 |
| 5,314,267 | A * | 5/1994 | Osadchuk | E21B 21/00 175/53 |
| 5,944,452 | A * | 8/1999 | Reinert, Sr. | E02D 7/20 405/232 |
| 6,299,381 | B1 * | 10/2001 | Liebrecht, Jr. | E02F 3/06 37/350 |
| 6,343,663 | B1 * | 2/2002 | Hill | E21B 7/005 173/188 |

(Continued)

*Primary Examiner* — Thomas E Lazo
(74) *Attorney, Agent, or Firm* — Conley Rose, P.C.

(57) ABSTRACT

An apparatus for installing a land anchor of a foundation in an earthen surface includes an articulated arm assembly including a first linear actuator and a drill configured to releasably couple to a helical member, and a control system coupled to the articulated arm assembly and configured to operate the first linear actuator in a free-floating mode configured to maintain an installation angle between the drill and the earthen surface as the helical member is drilled into the earthen surface.

22 Claims, 4 Drawing Sheets

(56) References Cited

U.S. PATENT DOCUMENTS

| | | | | |
|---|---|---|---|---|
| 6,571,902 B2* | 6/2003 | Heyne | ............... | A01B 63/10 |
| | | | | 180/321 |
| 6,997,221 B2* | 2/2006 | Kurelek | ............... | B66C 13/18 |
| | | | | 144/34.1 |
| 7,729,835 B2* | 6/2010 | Morris | ............... | E02F 9/2004 |
| | | | | 701/50 |
| 7,752,842 B2* | 7/2010 | Hristov | ............... | B66F 9/22 |
| | | | | 60/460 |
| 8,037,807 B2* | 10/2011 | Callaghan | ............ | E02F 9/2033 |
| | | | | 91/361 |
| 8,585,327 B2* | 11/2013 | Thurner | ............... | E02D 7/02 |
| | | | | 405/232 |
| 9,057,389 B2* | 6/2015 | Opdenbosch | ......... | E02F 9/2292 |
| 2012/0037251 A1* | 2/2012 | Ohmer | ............... | F15B 13/021 |
| | | | | 137/637 |
| 2014/0360059 A1* | 12/2014 | Garrison | ............... | E02F 3/06 |
| | | | | 37/403 |
| 2018/0180068 A1* | 6/2018 | Fukuda | ............... | E02F 9/2217 |

* cited by examiner

APPARATUS FOR INSTALLING A LAND ANCHOR

CROSS-REFERENCE TO RELATED APPLICATIONS

This application claims benefit of U.S. provisional application Ser. No. 62/905,788 filed Sep. 25, 2019, and entitled "Apparatus for Installing a Land Anchor," which is hereby incorporated herein by reference in its entirety.

STATEMENT REGARDING FEDERALLY SPONSORED RESEARCH OR DEVELOPMENT

Not applicable.

BACKGROUND

This disclosure relates to apparatuses for installing auger-type anchors in an earthen surface. Particularly, this disclosure relates to apparatuses for setting land anchors using an articulated arm such that a desired installation angle formed between a central or longitudinal axis of a drill attached to the auger anchor of the apparatus and the earthen surface is maintained as the drill is extended towards the earthen surface.

Foundations are used in some applications to transfer loads from above-ground structures to the earth via one or more piles or pilings comprising vertically oriented, elongate structures which extend into an earthen surface. Foundations may include prefabricated piles that are driven into the ground using a pile driver, and drilled piles (e.g., caissons, drilled shafts, drilled piers, cast-in-drilled-hole piles, and/or cast-in-situ piles, etc.) formed by drilling a borehole into the earth and placing either a prefabricated pile (e.g., an auger anchor) or a fluid (e.g., cement or other reinforcing materials) in the drilled borehole. For example, a drilled pile may comprise an augercast pile formed by drilling into the ground with a hollow stemmed auger to a desired depth, and then pumping a fluid (e.g., a cement grout mix, etc.) down a stem of the auger and into the borehole formed by the auger. As used herein, the term "land anchor" is intended to broadly encompass piles, prefabricated anchors, and anchors that are cast in situ. In some conventional systems, specialized equipment attached to a heavy duty truck or other large vehicle may be employed for setting auger anchors. The size and weight of the vehicle, as well as the size and weight of the equipment supported by the vehicle and used to install the auger anchors, limit the ability of conventional systems to install auger anchors in amphibious environments like marshes, wetlands, and swamps, where the mobility of the truck and associated equipment are limited.

BRIEF SUMMARY

An embodiment of an apparatus for installing a land anchor of a foundation in an earthen surface comprises an articulated arm assembly comprising a first linear actuator and a drill configured to releasably couple to a helical member, and a control system coupled to the articulated arm assembly and configured to operate the first linear actuator in a free-floating mode configured to maintain an installation angle between the drill and the earthen surface as the helical member is drilled into the earthen surface. In some embodiments, the apparatus comprises a tracked amphibious vehicle. In some embodiments, the articulated arm assembly comprises a first arm pivotably coupled to a mount of a chassis of the apparatus at a first pivot joint, a second pivot arm pivotably coupled to the first pivot arm at a second pivot joint that is separate from the first pivot joint, and a third pivot arm pivotably coupled to the second pivot arm at a third pivot joint that is separate from the first pivot joint and the second pivot joint. In certain embodiments, the articulated arm assembly comprises a second linear actuator comprising a first end pivotably coupled to the second arm and a first end pivotably coupled to the first arm, and a third linear actuator comprising a first end pivotably coupled to the third arm and a first end pivotably coupled to the second arm, wherein the first linear actuator comprises a first end pivotably coupled to the first arm and a second end pivotably coupled to the mount. In certain embodiments, the control system further comprises a control valve comprising a first control valve block fluidically coupled to the first linear actuator by a first extension fluid conduit and a first retraction fluid conduit, a second control valve block fluidically coupled to the second linear actuator by a second extension fluid conduit and a second retraction fluid conduit, and a third control valve block fluidically coupled to the third linear actuator by a third extension fluid conduit and a third retraction fluid conduit. In some embodiments, the control system further comprises a diverter valve comprising a first diverter valve block fluidically coupled to the first linear actuator by a fourth extension fluid conduit and a fourth retraction fluid conduit, and a second diverter valve block fluidically coupled to the third linear actuator by a fifth extension fluid conduit and a fifth retraction fluid conduit, wherein a control fluid is restricted from flowing from the first extension fluid conduit, through the first diverter valve block, and into the first retraction fluid conduit when the diverter valve is in a closed position, wherein the control fluid is permitted to flow from the first extension fluid conduit, through the first diverter valve block, and into the first retraction fluid conduit when the diverter valve is in an open position. In some embodiments, the control fluid is restricted from flowing from the third extension fluid conduit, through the second diverter valve block, and into the third retraction fluid conduit when the diverter valve is in the closed position, and the control fluid is permitted to flow from the third extension fluid conduit, through the second diverter valve block, and into the third retraction fluid conduit when the diverter valve is in the open position. In some embodiments, the apparatus further comprises a diverter valve control operable by an operator of the apparatus to actuate the diverter valve between the open position and the closed position. In certain embodiments, the control valve further comprises a fourth control valve block fluidically coupled to the drill by an inlet fluid conduit and a return fluid conduit. In certain embodiments, the control system is configured to operate the third linear actuator in the free-floating mode. In some embodiments, the mount comprises a swing arm configured to permit the articulated arm assembly to pivot about a vertical axis relative to the chassis. In some embodiments, when the first linear actuator is in the free-floating mode, the articulated arm assembly is configured to maintain an angle between a central axis of the helical member and a surface upon which the apparatus is disposed as the helical member is drilled into the earthen surface.

An embodiment of an apparatus for installing a land anchor of a foundation in an earthen surface comprises an articulated arm assembly comprising a first linear actuator and a drill configured to releasably couple to an helical member, and a control system coupled to the articulated arm assembly and comprising a fluid source, a control valve configured to selectably apply pressurized control fluid from the fluid source to an extension side and a retraction side of the first linear actuator, and a diverter valve configured to selectably provide direct fluid communication between the extension side and the retraction side of the first linear actuator bypassing the control valve and the fluid source. In some embodiments, the control system comprises a control panel comprising a first control valve controller configured to selectably open a first port of the control valve to supply the pressurized control fluid from the fluid source to the extension side of the first linear actuator, and to selectably open a second port of the control valve to supply the pressurized control fluid from the fluid source to the retraction side of the first linear actuator, and a diverter controller configured to selectably open a first pair of ports of the diverter valve that are configured to provide direct fluid communication between the extension side and the retraction side of the first linear actuator bypassing the control valve the fluid source. In some embodiments, the articulated arm assembly comprises a first arm pivotably coupled to a mount of a chassis of the apparatus at a first pivot joint, a second pivot arm pivotably coupled to the first pivot arm at a second pivot joint that is separate from the first pivot joint, and a third pivot arm pivotably coupled to the second pivot arm at a third pivot joint that is separate from the first pivot joint and the second pivot joint. In certain embodiments, the articulated arm assembly comprises a second linear actuator comprising a first end pivotably coupled to the second arm and a first end pivotably coupled to the first arm, and a third linear actuator comprising a first end pivotably coupled to the third arm and a first end pivotably coupled to the second arm, wherein the first linear actuator comprises a first end pivotably coupled to the first arm and a second end pivotably coupled to the mount. In certain embodiments, the diverter valve is configured to selectably provide direct fluid communication between an extension side and a retraction side of the third linear actuator bypassing the control valve and the fluid source. In some embodiments, the diverter controller is configured to selectably open a second pair of ports of the diverter valve that are configured to provide direct fluid communication between the extension side and the retraction side of the third linear actuator bypassing the control valve the fluid source. In some embodiments, the control system further comprises a drill valve configured to selectably provide the drill with pressurized control fluid from the fluid source. In certain embodiments, the fluid source comprises a first fluid discharge configured to provide a first fluid flowrate to the control valve and a second fluid discharge configured to provide a second flowrate that is different from the first fluid flowrate to the drill valve.

Embodiments described herein comprise a combination of features and characteristics intended to address various shortcomings associated with certain prior devices, systems, and methods. The foregoing has outlined rather broadly the features and technical characteristics of the disclosed embodiments in order that the detailed description that follows may be better understood. The various characteristics and features described above, as well as others, will be readily apparent to those skilled in the art upon reading the following detailed description, and by referring to the accompanying drawings. It should be appreciated that the conception and the specific embodiments disclosed may be readily utilized as a basis for modifying or designing other structures for carrying out the same purposes as the disclosed embodiments. It should also be realized that such equivalent constructions do not depart from the spirit and scope of the principles disclosed herein.

BRIEF DESCRIPTION OF THE DRAWINGS

For a detailed description of various exemplary embodiments, reference will now be made to the accompanying drawings in which.

DETAILED DESCRIPTION

Figure 1:
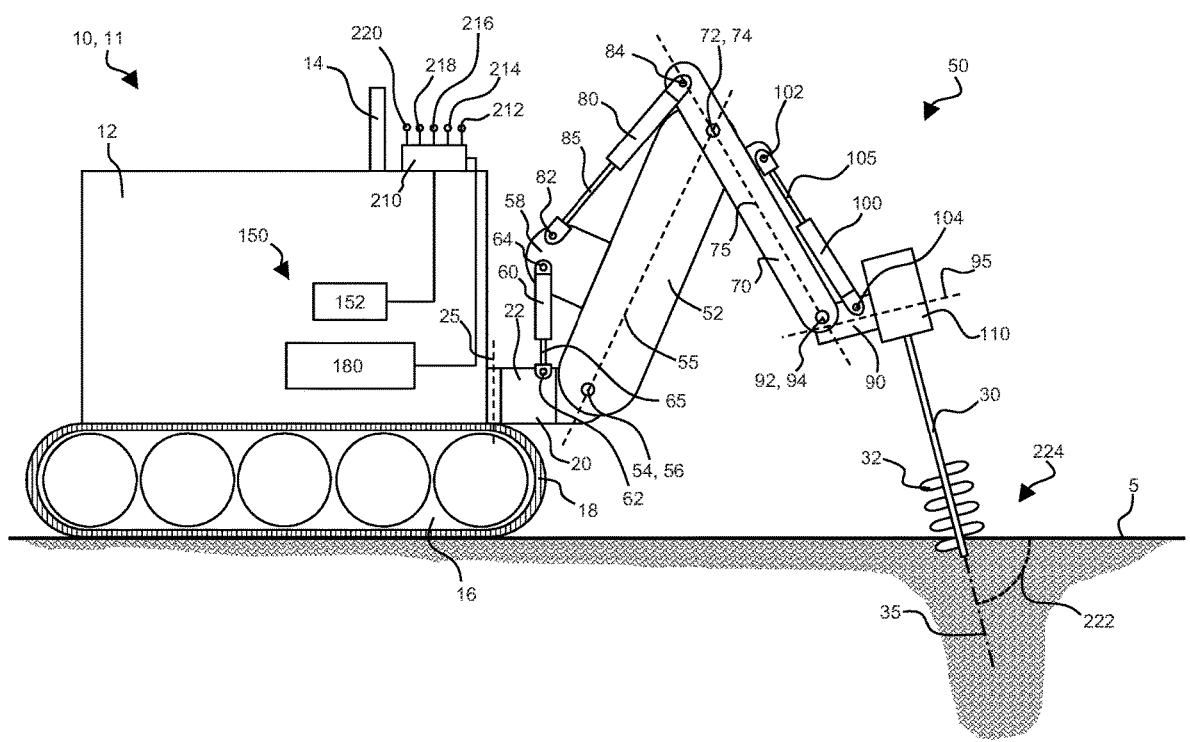
FIG. 1 is a schematic view of an embodiment of an apparatus for installing an auger anchor shown in a first position in accordance with the principles disclosed herein.

The following discussion is directed to various exemplary embodiments. However, one of ordinary skill in the art will understand that the examples disclosed herein have broad application, and that the discussion of any embodiment is meant only to be exemplary of that embodiment, and not intended to suggest that the scope of the disclosure, including the claims, is limited to that embodiment.

The drawing figures are not necessarily to scale. Certain features and components herein may be shown exaggerated in scale or in somewhat schematic form and some details of conventional elements may not be shown in interest of clarity and conciseness.

In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct connection of the two devices, or through an indirect connection that is established via other devices, components, nodes, and connections. In addition, as used herein, the terms "axial" and "axially" generally mean along or parallel to a given axis (e.g., central axis of a body or a port), while the terms "radial" and "radially" generally mean perpendicular to the given axis. For instance, an axial distance refers to a distance measured along or parallel to the axis, and a radial distance means a distance measured perpendicular to the axis. Further, when used herein (including in the claims), the words "about," "generally," "substantially," "approximately," and the like mean within a range of plus or minus 10%.

As described above, equipment, such as trucks or other vehicles, may be employed in setting auger anchors. In some applications, an articulated arm attachable to a vehicle may be employed for setting land anchors, the articulated arm comprising a plurality of pivotably coupled or articulated members coupled to a drill used to apply a torque to an auger whereby the auger may be drilled into an earthen surface to a desired depth. The articulated members may be individually controlled by a plurality of linear actuators operable by an operator or pilot of the articulated arm. In some applications, it may be desirable to maintain a desired installation angle between a drill to which an auger or auger anchor is attached and the earthen surface as the auger or auger anchor is drilled into the earthen surface. However, maintaining a constant installation angle between the drill and the earthen surface as the auger or auger anchor is drilled into the earthen surface may require precisely controlling each of the plurality of linear actuators concurrently. For instance, one or more of the linear actuators may need to be retracted as one or more other linear actuators are concurrently extended at an appropriate rate to maintain the desired installation angle, a cumbersome and difficult process for the operator of the articulated arm assembly.

Embodiments disclosed herein include apparatuses for installing land anchors that allow for the maintaining of an installation angle between a drill of the apparatus and an earthen surface as an auger or auger anchor coupled to the drill is drilled into the surface through the operation of only a single linear actuator. In other words, an operator of the apparatus need only extend a single linear actuator in order to drill the auger or auger anchor into the earthen surface at a constant installation angle, avoiding the difficulty of operating multiple linear actuators concurrently in order to maintain the installation angle of the auger or auger anchor. Embodiments disclosed herein include control systems comprising a control valve for controlling the operation of a plurality of linear actuators and a diverter valve configured to place one or more of the linear actuators into a "free-floating" mode whereby the one or more of the linear actuators are permitted to freely extend and retract in response to the application of external forces to the one or more linear actuators. By allowing the one or more linear actuators to freely extend and retract, the installation angle between the drill and the earthen surface may be maintained as the operator of the apparatus extends one of the plurality of linear actuators.

Figure 3:
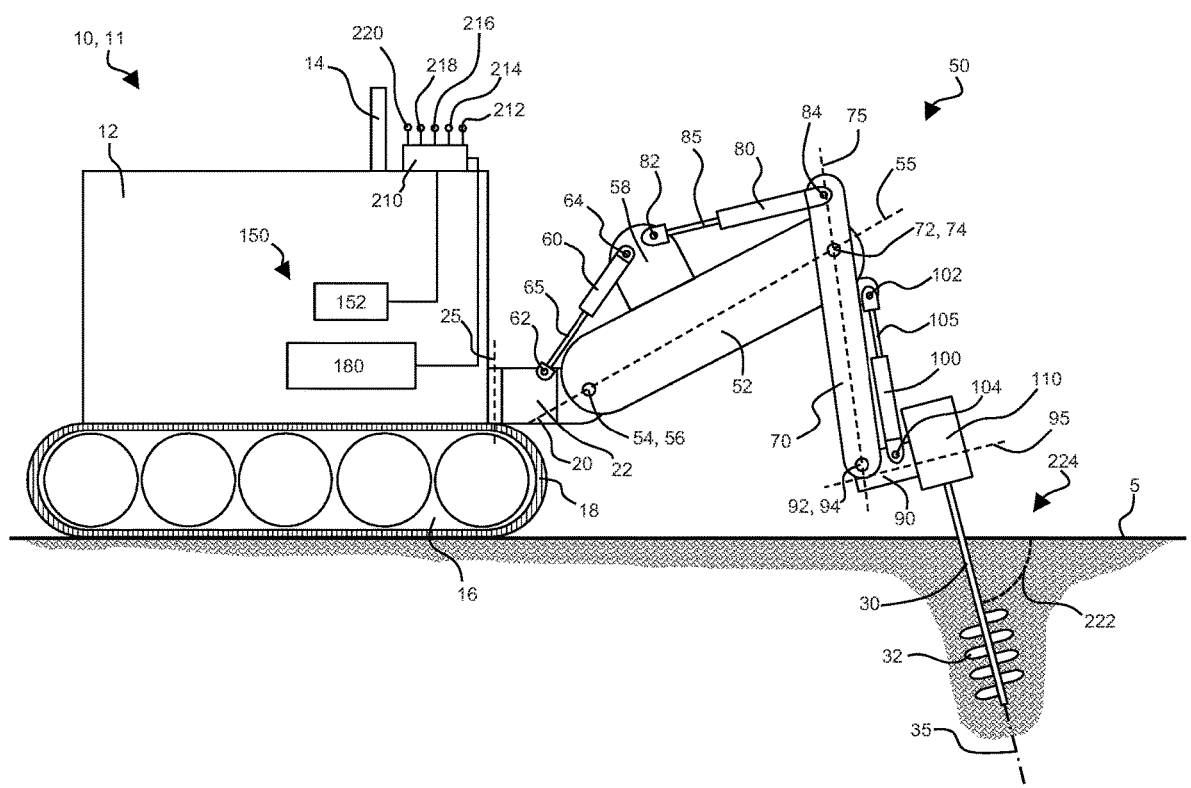
FIG. 3 is another schematic view of the apparatus of FIG. 1 shown in a second position.
Figure 4:
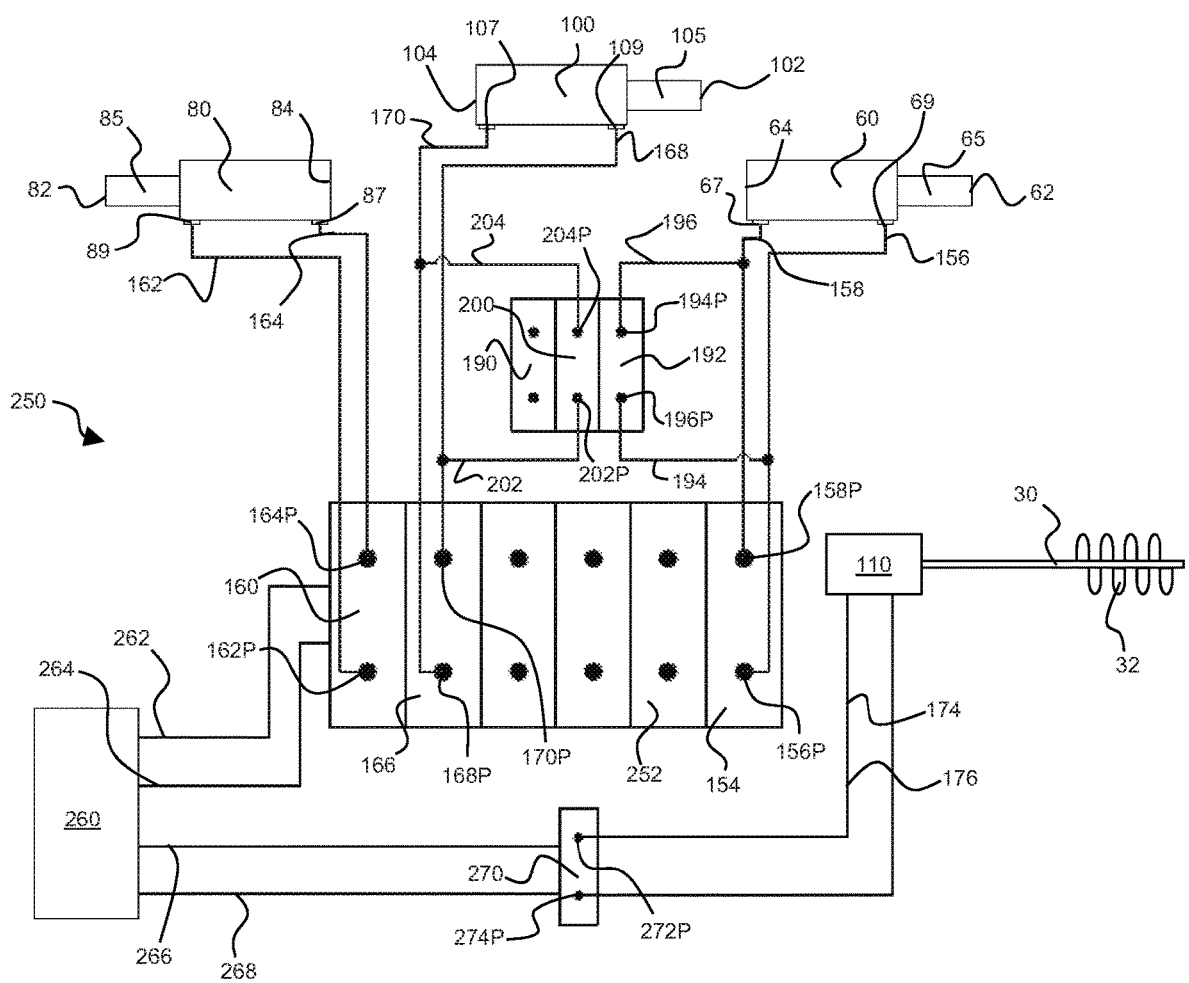
FIG. 4 is a schematic view of another embodiment of the hydraulic system of the apparatus of FIG. 1 in accordance with the principles disclosed herein.

Referring now to FIGS. 1, 3, an embodiment of an apparatus 10 for installing a helical member or auger anchor in an earthen surface 5 is shown. In the embodiment of FIGS. 1, 3, apparatus 10 comprises a tracked amphibious vehicle or marsh buggy 11 that includes an articulated arm assembly 50 configured to releasably couple with and manipulate an auger 30. In some embodiments, auger 30 may comprise a land or auger anchor and thus may also be referred to as an auger anchor 30 herein; however, in other embodiments, auger 30 may comprise an auger configured to drill a borehole in earthen surface 5 in which a land anchor may be formed in situ by filling the drilled borehole with a fluid (e.g., a cement grout mix, etc.). As will be described further herein, marsh buggy 11 also includes a control system 150 for controlling at least some of the components of the articulated assembly 50. In other embodiments, apparatus 10 may comprise various vehicles, movable platforms, and/or stationary platforms from which a land or auger anchor (e.g., auger anchor 30) may be installed or drilled into earthen surface 5 to form a portion of a foundation (e.g., a deep foundation) of a structure.

In this embodiment, marsh buggy 11 generally includes a chassis 12 having one or more chassis cross-members (not shown) to support articulated arm assembly 50 thereon. Marsh buggy 11 also includes a pair of pontoons 16 connected to chassis 12 by the pair of cross-members of chassis 12. Each pontoon 16 of marsh buggy 11 is equipped with an endless-chain track 18 having a plurality of cleats or treads positioned on an outer surface thereof for providing traction to marsh buggy 11. Marsh buggy 11 includes a powertrain or drive system (not shown) that independently rotates endless tracks 18 about their respective pontoons 16. In this embodiment, the rotation of endless tracks 18 may be the primary method of transporting and positioning marsh buggy 11. For example, by varying the speed and direction of each track 18, marsh buggy 11 is able to advance, change course, or reverse direction.

In this embodiment, pontoons 16 of marsh buggy 11 may be each rigid hollow structures, typically air-filled, that provide buoyancy or "flotation" in amphibious environments to stabilize and support marsh buggy 11 with articulated arm assembly 50 supported thereon. Thus, marsh buggy 11 may comprise an amphibious vehicle capable of operating in amphibious environments. Pontoons 16 allow marsh buggy 11 to work in more difficult terrain and operating environments. Pontoons 16 may be constructed of steel or aluminum alloys and capable of flotation as described above. Additionally, pontoons 16 are configured to permit tracks 18 of marsh buggy 11 to contact marshy ground (e.g., earthen surface 5) as required for the operation of articulated arm assembly 50. Therefore, pontoons 16 of marsh buggy 11 may be sized such that marsh buggy 11 does not float in water where it is desired to operate marsh buggy 11. At the same time, pontoons 16 are sized to provide sufficient buoyancy to stabilize and support marsh buggy 11 and articulated arm assembly 50 when marsh buggy 11 is operated in water or swampy terrain.

As described above, marsh buggy 11 includes articulated arm assembly 50 for manipulating an auger anchor 30. In this embodiment, articulated arm assembly 50 is coupled to an end of the chassis 12 of marsh buggy 11 via a chassis mount 20 extending from chassis 12. Chassis mount 20 has a first or inner end coupled or affixed to an end of chassis 12 and a second end distal chassis 12. Chassis mount 20 may comprise a swing arm 22 permitting articulated arm assembly 50 to rotate about a vertical axis 25, extending substantially vertical relative to earthen surface 5) relative to chassis 12 of marsh buggy 11. Particularly, the swing arm 22 of chassis mount 20 may permit articulated arm assembly 50 to rotate a fixed amount or sweep (e.g., approximately 30-60 degrees) about vertical axis 25 relative to chassis 12. In some embodiments, the swing arm 11 of chassis mount 20 may include a swing cylinder or linear actuator (not shown in FIG. 1) configured to control the angular position of articulated arm assembly 50 about the vertical axis 25 relative to chassis 12. However, in certain embodiments, chassis mount 20 may not include a swing arm, and instead, articulated arm assembly 50 may be mounted to chassis 12 via chassis mount 20 such that articulated arm assembly 50 is not permitted to rotate about a vertical axis relative to chassis 12.

In this embodiment, articulated arm assembly 50 generally includes a first arm or boom 52 pivotably coupled to chassis 12 via chassis mount 20, a second or dipper arm 70 pivotably coupled to boom 52, and a third or auger arm pivotably coupled to dipper arm 70. Particularly, boom 52 comprises an elongate member extending along a central or longitudinal axis 55 and is pivotably coupled to chassis mount 20 via a first pivot joint or coupling 54 positioned proximal a first end of boom 52. Additionally, boom 52 is pivotably coupled to dipper arm 70 of articulated arm assembly 50 via a second pivot joint or coupling 72. In some embodiments, central axis 55 of boom 52 extends through both the first pivot joint 54 and second pivot joint 72. In this embodiment, boom 52 is permitted to rotate relative chassis mount 20 about a first lateral or horizontal (i.e., extending substantially horizontal relative the earthen surface 5) pivot axis 56 which extends through first pivot joint 54. Articulated arm assembly 50 additionally includes a first or boom cylinder or linear actuator 60 configured to control the angular position of boom 52 about first pivot axis 56 relative chassis mount 20 and chassis 12 of marsh buggy 11.

Boom cylinder 60 comprises a first end 62 that is telescopically extendable/retractable relative to a second, opposing end 64 of boom cylinder 60. First end 62 of boom cylinder 60 is pivotably coupled to chassis mount 20 at a location between the inner and outer ends of mount 20, while second end 64 of boom cylinder 60 is pivotably connected to a cylinder mount 58 of boom 52 which is offset from central axis 55 of boom 52. In this configuration, extension of boom cylinder 60 (i.e., extension of first end 62 from second end 64 of boom cylinder 60) urges boom 52 in a first rotational direction (clockwise in FIGS. 1, 3) about the first pivot axis 56 relative chassis mount 20. Conversely, retraction of boom cylinder 60 (i.e., retraction of first end 62 towards second end 64 of boom cylinder 60) urges boom 52 in a second rotational direction (counter-clockwise in FIGS. 1, 3), opposite the first rotational direction, about first pivot axis 56 relative chassis mount 20.

Dipper arm 70 of articulated arm assembly 50 comprises an elongate member extending along a central or longitudinal axis 75 and is pivotably coupled to boom 52 via second pivot joint 72 positioned between opposing first, second ends of dipper arm 70. Additionally, dipper arm 70 is pivotably coupled to auger arm 90 of articulated arm assembly 50 via a third pivot joint or coupling 92. In some embodiments, central axis 75 of dipper arm 70 extends through both the second pivot joint 72 and third pivot joint 92. In this embodiment, dipper arm 70 is permitted to rotate relative boom 52 about a second lateral or horizontal (i.e., extending substantially horizontal relative the earthen surface 5) pivot axis 74 which extends through second pivot joint 72. Articulated arm assembly 50 additionally includes a second or dipper cylinder or linear actuator 80 configured to control the angular position of dipper arm 70 about second pivot axis 74 relative boom 52 of articulated arm assembly 50.

Dipper cylinder 80 comprises a first end 82 that is telescopically extendable/retractable relative to a second, opposing end 84 of dipper cylinder 80. First end 82 of dipper cylinder 80 is pivotably coupled to boom 52 at cylinder mount 58, while second end 84 of dipper cylinder 80 is pivotably connected to dipper arm 70 at a location along dipper arm 70 positioned between the first end of dipper arm 70 and second pivot joint 72. In this configuration, extension of dipper cylinder 80 urges dipper arm 70 in a first rotational direction (clockwise in FIGS. 1, 3) about the second pivot axis 74 relative boom 52. Conversely, retraction of dipper cylinder 80 urges dipper arm 70 in a second rotational direction (counter-clockwise in FIGS. 1, 3), opposite the first rotational direction, about second pivot axis 74 relative boom 52.

Auger arm 90 of articulated arm assembly 50 comprises an elongate member extending along a central or longitudinal axis 95 and is pivotably coupled to dipper arm 70 via third pivot joint 92 positioned proximal a first or inner end of auger arm 90. Additionally, a second or outer end opposite the inner end of auger arm 90 is coupled or rigidly attached to an auger drill or torque head 110 of articulated arm assembly 50. In an embodiment, rather than drill 110, a bucket may be coupled to the end of auger arm 90. In some embodiments, auger drill 110 has a central or longitudinal axis extending at an angle relative to central axis 95 of auger arm 90. Auger drill 110 is rotatably coupled with the auger anchor 30 and is configured to transmit a torque to the auger anchor and thereby rotate auger anchor 30 about a central or longitudinal axis 35 of auger anchor 30 which may be coaxial with the central axis of the auger drill 110. Given that the central axes of anchor 30 and drill 110 may be coaxial, central axis 35 may also be referred to herein as the central axis 35 of drill 110. In some embodiments, the central axis 35 of drill 110 may be defined by an axis of rotation about which auger anchor 30 rotates.

In this embodiment, auger arm 90 is permitted to rotate relative dipper arm 70 about a third lateral or horizontal (i.e., extending substantially horizontal relative the earthen surface 5) pivot axis 94 which extends through third pivot joint 92. Articulated arm assembly 50 further includes a third or auger cylinder or linear actuator 102 configured to control the angular position of auger arm 90 about third pivot axis 94 relative dipper arm 70 of articulated arm assembly 50.

Auger cylinder 100 comprises a first end 102 that is telescopically extendable/retractable relative to a second, opposing end 104 of auger cylinder 100. First end 102 of dipper cylinder 100 is pivotably coupled to dipper arm 70, while second end 104 of auger cylinder 100 is pivotably connected to auger arm 90. In this configuration, extension of auger cylinder 100 urges auger arm 90 in a first rotational direction (clockwise in FIGS. 1, 3) about the third pivot axis 94 relative dipper arm 70. Conversely, retraction of auger cylinder 100 urges auger arm 90 in a second rotational direction (counter-clockwise in FIGS. 1, 3), opposite the first rotational direction, about third pivot axis 94 relative dipper arm 70.

Figure 2:
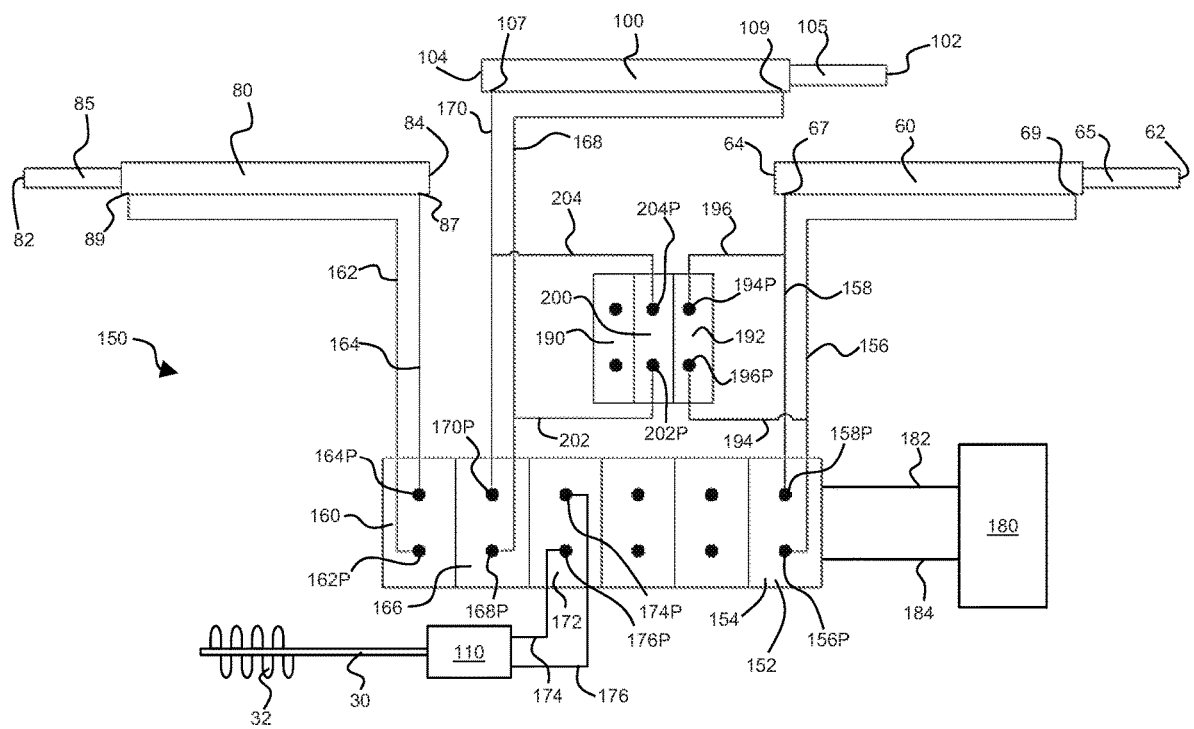
FIG. 2 is a schematic view of a hydraulic system of the apparatus of FIG. 1 in accordance with the principles disclosed herein.

Marsh buggy 11 additionally includes a control system 150 for controlling the actuation of cylinders 60, 80, 100 of the articulated arm assembly 50. Referring now to FIGS. 1-3, a schematic of the control system 150 of the marsh buggy 11 of FIGS. 1, 3 is shown in FIG. 2. In the embodiment of FIGS. 1-3, control system 150 comprises a hydraulic control system that generally includes a hydraulic control valve 152, a fluid source 180, a hydraulic diverter valve 190, and a control panel 210. In other embodiments, control system 150 may be electronic and cylinders 60, 80, 100 may each comprise electrical linear actuators. In still other embodiments, cylinders 60, 80, and 100 may comprise pneumatic linear actuators. In some embodiments, control system 150, including control valve 152, fluid source 180, diverter valve 190, and control panel 210, are supported on the chassis 12 of marsh buggy 11. Fluid source 180 of control system 150 provides a source of pressurized hydraulic or control fluid for selectively actuating cylinders 60, 80, 100, and drill 110 of marsh buggy 11. In some embodiments, fluid source 180 may comprise a pump and thus may also be referred to herein as pump 180; however, in other embodiments, fluid source 180 may comprise mechanisms other than pumps for providing a source of pressurized hydraulic or control fluid.

Hydraulic control valve 152 of control system 150 is configured to control the operation of cylinders 60, 80, 100, and drill 110 of marsh buggy 11. Particularly, control valve 152 controls fluid flow between the pump 180 of control system 150 and cylinders 60, 80, 100, and drill 110 of marsh buggy 11. As shown particularly in FIG. 2, control valve 152 may receive as an input pressurized hydraulic or control fluid flowing from a fluid discharge 182 of pump 180 extending between pump 180 and control valve 152. Additionally, control valve 152 may return hydraulic fluid to pump 180 via fluid return or inlet 184 of pump 180 extending between pump 180 and control valve 152. While in this embodiment pump 180 includes only a single fluid circuit comprising a single fluid discharge 182 and a single fluid inlet 184, in other embodiments, pump 180 may include a plurality of fluid circuits in fluid communication therewith.

In this embodiment, control valve 152 comprises a plurality of control valve blocks, including a first control or boom valve block 154, a second control or dipper valve block 160, a third control or auger valve block 166, and a fourth control or drill valve block 172. In this embodiment, each cylinder 60, 80, and 100 comprises a hydraulic cylinder including a piston 65, 85, and 105, respectively, and may have a first or extension side 67, 87, and 107, respectively, and a second or retraction side 69, 89, and 109, respectively, opposite the extension side 67, 87, and 107. Fluid pressurization of the extension side of each cylinder 60, 80, 100 urges the piston 65, 85, and 105, respectively, of each cylinder 60, 80, 100, to extend whereas pressurization of the retraction side of each cylinder 60, 80, and 100 urges the piston 65, 85, and 105, respectively, of each cylinder 60, 80, and 100 to retract.

Boom valve block 154 of control valve 152 is fluidically coupled to the retraction side of boom cylinder 60 via a retraction fluid conduit 156 extending between the retraction side 69 of boom cylinder 60 and a retraction port 156P of boom valve block 154. Boom valve block 154 is also fluidically coupled to the extension side of boom cylinder 60 via an extension fluid conduit 158 extending between the extension side 67 of boom cylinder 60 and an extension port 158P of boom valve block 154. In this configuration, pressurization of retraction fluid conduit 156 (e.g., via fluid discharge 182 of pump 180) and venting (e.g., venting to fluid inlet 184 of pump 180) of extension fluid conduit 158 results in the retraction of boom cylinder 60, whereas the pressurization of extension fluid conduit 158 and venting of retraction fluid conduit 156 results in the extension of boom cylinder 60.

In this embodiment, dipper valve block 160 of control valve 152 is fluidically coupled to the retraction side of dipper cylinder 80 via a retraction fluid conduit 162 extending between the retraction side 89 of dipper cylinder 80 and a retraction port 162P of dipper valve block 160. Dipper valve block 160 is also fluidically coupled to the extension side of dipper cylinder 80 via an extension fluid conduit 164 extending between the extension side 87 of dipper cylinder 80 and an extension port 164P of dipper valve block 160. In this configuration, pressurization of retraction fluid conduit 162 and venting of extension fluid conduit 164 results in the retraction of dipper cylinder 80, whereas the pressurization of extension fluid conduit 164 and venting of retraction fluid conduit 162 results in the extension of dipper cylinder 80.

In this embodiment, auger valve block 166 is fluidically coupled to the retraction side of auger cylinder 100 via a retraction fluid conduit 168 extending between the retraction side 109 of auger cylinder 100 and a retraction port 168P of auger valve block 166. Auger valve block 166 is also fluidically coupled to the extension side of auger cylinder 100 via an extension fluid conduit 170 extending between the extension side 107 of auger cylinder 100 and an extension port 170P of auger valve block 166. In this configuration, pressurization of retraction fluid conduit 168 and venting of extension fluid conduit 170 results in the retraction of auger cylinder 100, whereas the pressurization of extension fluid conduit 170 and venting of retraction fluid conduit 168 results in the extension of auger cylinder 100. In this embodiment, drill valve block 172 is fluidically coupled to drill 110 via a first or inlet fluid conduit 174 extending between drill 110 and an inlet port 174P of drill valve block 170, and a second or return fluid conduit 176 extending between drill 110 and a return port 176P of drill valve block 170. In this configuration, pressurization of inlet fluid conduit 174 (e.g., via fluid discharge 182 of pump 180) and venting of return fluid conduit 176 (e.g., venting to the fluid inlet 184 of pump 180) results in the actuation of drill 110 whereby drill applies a torque to auger anchor 30 to thereby rotate auger anchor 30 about central axis 35.

Diverter valve 190 of control system 150 is configured to selectively place boom cylinder 60 and/or auger cylinder 100 into a "free-floating" mode where hydraulic or control fluid is permitted to flow freely between the extension and retraction sides of boom cylinder 60 and auger cylinder 100, respectively. In other words, the free-floating mode of diverter valve 190 permits fluid to travel directly between retraction fluid conduit 156 and extension fluid conduit 158 bypassing control valve 152 and pump 180. Similarly, the free-floating mode of diverter valve 190 permits fluid to travel directly between retraction fluid conduit 168 and extension fluid conduit 170 bypassing control valve 152 and pump 180.

In this embodiment, diverter valve 190 generally includes a first or boom valve block 192 and a second or auger valve block 200. Boom valve block 192 of diverter valve 190 is fluidically coupled to the retraction side of boom cylinder 60 via a retraction fluid conduit 194 that is fluidically coupled to retraction fluid conduit 156 (which extends to boom cylinder 60) and a retraction port 194P of boom valve block 192. Boom valve block 192 is also fluidically coupled to the extension side of boom cylinder 60 via an extension fluid conduit 196 that is fluidically coupled to extension fluid conduit 158 (which extends to boom cylinder 60) and an extension port 196P of boom valve block 192. Auger valve block 200 of diverter valve 190 is fluidically coupled to the retraction side of auger cylinder 100 via a retraction fluid conduit 202 fluidically coupled to retraction fluid conduit 168 (which extends to auger cylinder 100) and a retraction port 202P of auger valve block 200. Auger valve block 200 is also fluidically coupled to the extension side of auger cylinder 100 via an extension fluid conduit 204 fluidically coupled to extension fluid conduit 170 (which extends to auger cylinder 100) and an extension port 204P of auger valve block 200.

Control panel 210 (shown schematically in FIG. 1) of control system 150 includes controls that allow an operator or pilot of marsh buggy 11 to manipulate control valve 152 and/or diverter valve 190. Control panel 210 may be positioned adjacent a seat 14 located proximal articulated arm assembly 50 to provide the operator of marsh buggy 11 with an unobstructed view of articulated arm assembly 50 when the operator controls articulated arm assembly 50 using control panel 210. The seat 14 located adjacent control panel 210 may be separate from a driver's seat (not shown) of marsh buggy 11 located adjacent controls (not shown) for controlling the powertrain of marsh buggy 11.

In this embodiment, control panel 210 includes controllers 212, 214, 216, 218, and 220 for operating control valve 152 and diverter valve 190 of control system 150. Particularly, a first or boom controller 212 of control panel 210 controls the operation of the boom valve block 154 of control valve 152, a second or dipper controller 214 controls the operation of the dipper valve block 160 of control valve 152, and a third or auger controller 216 controls the operation of the auger valve block 166 of control valve 152. Controllers 212, 214, and 216 may each comprise a lever that when pressed in a first direction retracts cylinders 60, 80, and 100, respectively, and extends cylinders 60, 80, and 100, respectively, when pressed in a second direction opposite the first direction.

For example, pressing boom controller 212 in the first direction may allow pressurized hydraulic fluid to be communicated from the fluid discharge 182 of pump 180 to retraction fluid conduit 156 while also allowing fluid in extension fluid conduit 156 to vent (e.g., to the fluid inlet 184 of pump 180), thereby causing boom cylinder 60 to retract. As another example, pressing dipper controller 214 in the second direction may allow pressurized hydraulic fluid to be communicated from the fluid discharge 182 of pump 180 to extension fluid conduit 164 while also allowing fluid in retraction fluid conduit 162 to vent (e.g., to the fluid inlet 184 of pump 180), thereby causing dipper cylinder 80 to extend. In some embodiments, each controller 212, 214, and 216 may comprise a lever; however, in other embodiments, each controller 212, 214, and 216 may comprise varying control mechanisms offering two-way (i.e., extension/retraction) control over cylinders 60, 80, and 100, respectively.

In this embodiment, controller 218 of control panel 210 comprises a drill controller 218 configured for controlling the operation of the drill 110 of marsh buggy 11. Particularly, drill controller 218 may comprise a button or switch having an "on" and an "off" position. When drill controller 218 is disposed in the on position, drill valve block 172 of control valve 152 is opened and fluid is permitted to flow from fluid discharge 182 of pump 180, through inlet fluid conduit 174, and into drill 110 to thereby power drill 110 and apply a torque to the auger anchor 30 rotatably coupled to drill 110. From drill 110, the fluid may return through return fluid conduit 176 and to the fluid inlet 184 of pump 180. However, when drill controller 218 is in the off position, fluid drill valve block 172 of control valve 152 is closed such that fluid does not circulate through fluid conduits 174, 176 to drill 110.

Additionally, in this embodiment, controller 220 of control unit 210 comprises a diverter controller or switch 220 used to operate diverter valve 190 of control system 150. Particularly, diverter controller 220 may comprise a button or switch having an "open" and a "closed" position. In the closed position of diverter control 220, diverter valve 190 is closed such that fluid may not be communicated directly between ports 194P, 196P of boom valve block 192, and fluid may not be communicated directly between ports 202P, 204P of auger valve block 200. However, in the open position of diverter control 200, fluid may be communicated directly between ports 194P, 196P of boom valve block 192, and fluid may be communicated directly between ports 202P, 204P of auger valve block 200. Thus, in the open position of diverter controller 220, cylinders 60, 100 are each placed in the free-floating mode where pressure within retraction fluid conduit 156 is permitted to balance with pressure in extension fluid conduit 158, and pressure within retraction fluid conduit 168 is permitted to balance with pressure in extension fluid conduit 170. In other words, when diverter control hydraulic fluid may freely travel between the extension and retraction sides of boom cylinder 60 thereby equalizing pressure between fluid conduits 156, 158, and between the extension and retraction sides of auger cylinder 100 thereby equalizing pressure between fluid conduits 168, 170.

When cylinders 60, 100 are in the free-floating mode, cylinders 60, 100 will each maintain its position (i.e., will not extend or retract) unless an external force acts against one of the ends 62, 64, and 102, 104, of cylinders 60, 100, respectively. For example, when in the free-floating mode, boom cylinder 60 maintains its position until, for instance, a compressive force is applied to the first end 62 of boom cylinder 60 (e.g., from chassis mount 20). In this example, the compressive force applied to first end 62 of boom cylinder 60 causes boom cylinder 60 to retract, whereby hydraulic fluid on the extension side of boom cylinder 60 (e.g., fluid disposed in extension fluid conduit 158) is permitted to flow freely through boom valve block 192 of diverter valve 190 and into the retraction side of boom cylinder 60 (e.g., fluid disposed in retraction fluid conduit 156). As another example, when in the free-floating mode, auger cylinder 100 maintains its position until, for instance, a tensile force is applied to the first end 102 of auger cylinder 100. In this example, the tensile force applied to first end 102 of auger cylinder 100 causes auger cylinder 100 to extend, whereby hydraulic fluid on the retraction side of auger cylinder 100 (e.g., fluid disposed in retraction fluid conduit 162) is permitted to flow through auger valve block 200 of diverter valve 190 and into the extension side of auger cylinder 100 (e.g., fluid disposed in extension fluid conduit 170). In some embodiments, the controllers 212-220 of control unit 210 described above are directly or mechanically connected to control valve 152 and diverter valve 190; however, in other embodiments, controllers 212-220 may be electrical and may interact with valves 152, 190 via one or more solenoid valves. In still other embodiments, controls 210 may be distal marsh buggy 11 and thus control system 150 may be controlled remotely via controls 210.

Referring still to FIGS. 1-3, by placing each cylinder 60, 100 into the free-floating mode by opening the diverter valve 190 of control system 150, a desired installation angle 222 formed between the central axis 35 of drill 110/auger anchor 30 and earthen surface 5 may be maintained as auger anchor 30 is drilled into and through earthen surface 5. For example, marsh buggy 11 may be deployed to a job or worksite to assist with constructing a foundation for a structure by installing one or more auger anchors 30 into earthen surface 5. As shown particularly in FIG. 1, marsh buggy 11 may be positioned at the worksite using endless tracks 18 such that marsh buggy 11 is disposed adjacent a predefined location or installation site 224 along earthen surface 5 where it is desired to install an auger anchor 30 at a predefined, desired installation angle 222.

In some embodiments, once positioned adjacent installation site 224, an auger anchor 30 may be attached or rotatably coupled to drill 110 of marsh buggy 11, where a lower end of auger anchor 30 is suspended above the installation site 224. In other embodiments, auger anchor 30 may be rotatably coupled to drill 110 prior to the positioning of marsh buggy 11 adjacent installation site 224. Once auger anchor 30 has been attached to drill 110 of marsh buggy 11, with marsh buggy 11 being positioned adjacent installation site 224, controllers 212, 214, and/or 216 of control panel 210 may be operated by an operator of marsh buggy 11 to thereby manipulate the position of drill 110/auger anchor 30 relative to the earthen surface 5. Particularly, controllers 212, 214, and/or 216 are operated to position auger anchor 30 such that the central axis 35 of drill 110/auger anchor 30 is disposed at the desired installation angle 222 relative earthen surface 5. In this embodiment, the installation angle 222 is approximately 75 degrees relative to the earthen surface 5; however, in other embodiments, installation angle 222 between the central axis 35 of drill 110/auger anchor 30 and earthen surface 5 may vary. For example, installation angle 222 may vary between vertical (i.e., 90 degrees) and nearly horizontal (e.g., approaching 0 degrees) relative to the earthen surface 5 based on the particular application.

Once the central axis of the auger anchor 30 is disposed at the desired installation angle 222, the operator of marsh buggy 11 may switch diverter controller 220 from the closed position to the open position to thereby open the diverter valve 190 of control system 150. As described above, with diverter controller 220 in the open position, boom cylinder 60 and auger cylinder 100 are each in the free-floating mode and are thereby permitted to freely extend and/or retract in response to compressive and/or tensile forces applied to cylinders 60, 100, respectively. With diverter controller 220 disposed in the open position and cylinders 60, 100 each in the free-floating mode, the operator of marsh buggy 11 may switch drill controller 218 into the on position so that drill 110 provides a torque to the auger anchor 30 attached thereto and thereby rotates the auger anchor 30.

With auger anchor rotating about central axis 35, and with central axis 35 disposed at the desired installation angle 222, the operator of marsh buggy 11 may actuate dipper controller 214 to retract dipper cylinder 80. As shown particularly in FIG. 3, as dipper cylinder 80 is retracted by the operation of dipper controller 214, auger anchor 30 advances towards and penetrates or drills into earthen surface 5. The desired installation angle 222 between central axis 35 of drill 110/auger anchor 30 and earthen surface 5 is maintained as auger anchor 30 drills into the earthen surface 5 to a predetermined depth. Particularly, with both boom cylinder 60 and auger cylinder 100 in the free-floating mode, boom cylinder 60 extends and an auger cylinder 100 correspondingly retracts in response to the retraction of dipper cylinder 80 by the operation of dipper controller 214 to thereby maintain the desired installation angle 222 as auger anchor 30 drills into the earthen surface 5. As auger anchor 30 penetrates earthen surface 5, engagement between one or more helical screws 32 of the rotating auger anchor 30 and earthen surface 5 may result in the application of a tensile force to drill 110 from auger anchor 30, whereby the drilling of auger anchor 30 into earthen surface 5 pulls articulated arm assembly 50 towards a borehole 226 formed by anchor auger 30. The tensile or pulling force applied to the articulated arm assembly 50 by the rotating anchor auger 30 may extend along a vector coaxial with the central axis 35 of auger anchor 30 and thereby may assist with maintaining the installation angle 222 of drill 110/auger anchor 30 as auger anchor 30 is drilled to the desired depth.

Once auger anchor 30 is drilled to the desired depth, the operator of marsh buggy 11 may switch drill controller 218 to the off position to cease the application of torque from drill 110 to the auger anchor 30 extending into earthen surface 5. With drill controller 218 in the off position, the operator of marsh buggy 11 may disconnect auger anchor 30 from the drill 110 of articulated arm assembly 50, thereby disconnecting auger anchor 30 from marsh buggy 11. Additionally, diverter controller 220 of control panel 210 may be switched to the closed position to close diverter valve 190 and thereby return cylinders 60, 100 to normal (non-floating) mode of operation. Auger anchor 30, positioned at the desired installation angle 222 and drilled to the desired depth at installation site 224, forms a pile or anchor of a foundation for a structure. Following the installation of auger anchor 30, marsh buggy 11 may be repositioned using endless tracks 18 such that marsh buggy 11 is disposed adjacent a second installation site where a second auger anchor 30 may be attached to marsh buggy 11 and then drilled into earthen surface 5 at the second installation site at a desired installation angle (e.g., installation angle 222 shown in FIGS. 1, 3). As with the first auger anchor 30, the second auger anchor 30 may be drilled into the earthen surface 5 with the diverter controller 220 switched to the open position such that cylinders 60, 100 are in the free-floating mode as the second auger anchor 30 penetrates earthen surface 5. This process may be repeated until each auger anchor 30 of the foundation has been installed by marsh buggy 11.

Referring now to FIG. 5, another embodiment of a control system 250 of an apparatus for installing auger anchor 30 in earthen surface 5 is shown. In some embodiments, apparatus 10 and marsh buggy 11 shown in FIGS. 1, 3 may comprise control system 250 in lieu of the control system 150 shown particularly in FIG. 2. In some embodiments, controls 210 may be used to control the components of control system 250 described further herein. Additionally, control system 250 may include features in common with control system 150 shown particularly in FIG. 2 and shared features are labeled similarly.

In the embodiment of FIG. 5, control system 250 generally includes diverter valve 190, a control valve 252, a fluid source 260, and a drill valve 270. Control valve 252 is configured similarly as control valve 150 except that control valve 252 may not include drill valve block 172. Instead, control valve 252 may only include boom valve block 154, dipper valve block 160, and auger valve block 166. Thus, control valve 252 may not be used to control the operation of drill 110.

The fluid source 260 of control system 250 may provide a source of pressurized hydraulic or control fluid for selectively actuating cylinders 60, 80, 100, and drill 110 of marsh buggy 11. In some embodiments, fluid source 260 may comprise a pump and thus may also be referred to herein as pump 260; however, in other embodiments, fluid source 260 may comprise mechanisms other than pumps for providing a source of pressurized hydraulic fluid. In this embodiment, pump 260 provides two separate and distinct hydraulic circuits. While in this embodiment pump 260 is described as a single pump, in other embodiments, multiple pressure sources or pumps may be utilized for providing multiple independent hydraulic circuits to valves 252, 270.

A first hydraulic circuit provided by pump 260 may include a first fluid discharge 262 and a corresponding first fluid return or inlet 264. Pressurized hydraulic fluid may be supplied to control valve 252 via a first fluid discharge 262 extending between pump 260 and control valve 252 whereby cylinders 60, 80, and 100 of articulated arm assembly 50 may be retracted and extended. Hydraulic fluid may be returned to pump 260 from control valve 252 via a first fluid return or inlet 264 extending between control valve 252 and pump 260.

In this embodiment, rather than being controlled via control valve 252, drill 110 of mash buggy 11 is controlled via the drill valve 270 of control system 250. Drill valve 270 may be fluidically coupled to drill 110 via the inlet fluid conduit 174 extending between drill 110 and an inlet port 272P of drill valve 270, and the return fluid conduit 176 extending between drill 110 and a return port 274P of drill valve 270. A second hydraulic circuit may be provided by pump 260 for powering drill 110. Particularly, a second hydraulic circuit provided by pump 260 includes a second fluid discharge 266 and a corresponding second fluid return or inlet 268, where the second fluid discharge 266 and second fluid inlet 268 are isolated from the first fluid discharge 262 and first fluid inlet 264. Pressurized hydraulic or control fluid may be supplied to drill valve 270 via second fluid discharge 266 extending between pump 260 and drill valve 270 whereby the drill 110 may be supplied with pressurized hydraulic fluid via drill valve 270 which may be converted by drill 110 into rotatable torque. Hydraulic fluid may be returned to pump 260 from drill valve 270 via second fluid return 268 extending between drill valve 270 and pump 260.

By providing two separate and distinct hydraulic circuits to control valve 252 and drill valve 270, respectively, pump 260 may supply a first flowrate of pressurized hydraulic fluid to control valve 252 via first fluid discharge 262 and a second flowrate of pressurized hydraulic fluid to drill valve 270 via second fluid discharge 266 which is different from the first fluid flowrate. In some embodiments, the second flowrate supplied to drill 110 by pump 260 may be greater than the first flowrate supplied to cylinders 60, 80, and 100 by pump 260. For example, it may be desirable to supply drill 110 with a desired drilling fluid flowrate that corresponds to a maximum output torque providable by drill 110 to thereby maximize the amount of torque imparted to auger anchor 30. However, it may be undesirable to supply cylinders 60, 80, and 100 with a flowrate equal to the drilling flowrate. For instance, the drilling flowrate may be excessively high for cylinders 60, 80, 100 such that they become "jumpy" and difficult to control by an operator of marsh buggy 11. Thus, by providing two separate and distinct hydraulic circuits, pump 260 may provide a first flowrate desirable for actuating cylinders 60, 80, and 100, and a second flowrate desirable for operating drill 110 that is different from the first flowrate.

While exemplary embodiments have been shown and described, modifications thereof can be made by one skilled in the art without departing from the scope or teachings herein. The embodiments described herein are exemplary only and are not limiting. Many variations and modifications of the systems, apparatus, and processes described herein are possible and are within the scope of the disclosure. Accordingly, the scope of protection is not limited to the embodiments described herein, but is only limited by the claims that follow, the scope of which shall include all equivalents of the subject matter of the claims. Unless expressly stated otherwise, the steps in a method claim may be performed in any order. The recitation of identifiers such as (a), (b), (c) or (1), (2), (3) before steps in a method claim are not intended to and do not specify a particular order to the steps, but rather are used to simplify subsequent reference to such steps.

What is claimed is:

1. An apparatus for installing a land anchor of a foundation in an earthen surface, comprising:
   an articulated arm assembly comprising a first linear actuator and a drill configured to releasably couple to a helical member; and
   a control system coupled to the articulated arm assembly and configured to operate the first linear actuator in a free-floating mode configured to maintain an installation angle between the drill and the earthen surface as the helical member is drilled into the earthen surface.

2. The apparatus of claim 1, wherein the apparatus comprises a tracked amphibious vehicle.

3. The apparatus of claim 1, wherein the articulated arm assembly comprises:
   a first arm pivotably coupled to a mount of a chassis of the apparatus at a first pivot joint;
   a second pivot arm pivotably coupled to the first pivot arm at a second pivot joint that is separate from the first pivot joint; and
   a third pivot arm pivotably coupled to the second pivot arm at a third pivot joint that is separate from the first pivot joint and the second pivot joint.

4. The apparatus of claim 3, wherein the articulated arm assembly comprises:
   a second linear actuator comprising a first end pivotably coupled to the second arm and a second end pivotably coupled to the first arm; and
   a third linear actuator comprising a first end pivotably coupled to the third arm and a second end pivotably coupled to the second arm;
   wherein the first linear actuator comprises a first end pivotably coupled to the first arm and a second end pivotably coupled to the mount.

5. The apparatus of claim 4, wherein the control system further comprises a control valve, comprising:
   a first control valve block fluidically coupled to the first linear actuator by a first extension fluid conduit and a first retraction fluid conduit;
   a second control valve block fluidically coupled to the second linear actuator by a second extension fluid conduit and a second retraction fluid conduit; and
   a third control valve block fluidically coupled to the third linear actuator by a third extension fluid conduit and a third retraction fluid conduit.

6. The apparatus of claim 5, wherein the control system further comprises a diverter valve, comprising:
   a first diverter valve block fluidically coupled to the first linear actuator by a fourth extension fluid conduit and a fourth retraction fluid conduit; and
   a second diverter valve block fluidically coupled to the third linear actuator by a fifth extension fluid conduit and a fifth retraction fluid conduit;
   wherein a control fluid is restricted from flowing from the first extension fluid conduit, through the first diverter valve block, and into the first retraction fluid conduit when the diverter valve is in a closed position;
   wherein the control fluid is permitted to flow from the first extension fluid conduit, through the first diverter valve block, and into the first retraction fluid conduit when the diverter valve is in an open position.

7. The apparatus of claim 6, wherein:
   the control fluid is restricted from flowing from the third extension fluid conduit, through the second diverter valve block, and into the third retraction fluid conduit when the diverter valve is in the closed position; and
   the control fluid is permitted to flow from the third extension fluid conduit, through the second diverter valve block, and into the third retraction fluid conduit when the diverter valve is in the open position.

8. The apparatus of claim 6, further comprising a diverter valve control operable by an operator of the apparatus to actuate the diverter valve between the open position and the closed position.

9. The apparatus of claim 5, wherein the control valve further comprises a fourth control valve block fluidically coupled to the drill by an inlet fluid conduit and a return fluid conduit.

10. The apparatus of claim 4, wherein the control system is configured to operate the third linear actuator in the free-floating mode.

11. The apparatus of claim 3, wherein the mount comprises a swing arm configured to permit the articulated arm assembly to pivot about a vertical axis relative to the chassis.

12. The apparatus of claim 1 wherein, when the first linear actuator is in the free-floating mode, the articulated arm assembly is configured to maintain an angle between a central axis of the helical member and a surface upon which the apparatus is disposed as the helical member is drilled into the earthen surface.

13. The apparatus of claim 1, wherein:
   the articulated arm assembly comprises a second linear actuator coupled to the first linear actuator; and
   the control system is configured to operate both the first linear actuator and the second linear actuator in the free-floating mode whereby the installation angle between the drill and the earthen surface is automatically maintained in response to the helical member being drilled into the earthen surface.

14. An apparatus for installing a land anchor of a foundation in an earthen surface, comprising:
- an articulated arm assembly comprising a first linear actuator and a drill configured to releasably couple to an helical member; and
- a control system coupled to the articulated arm assembly and comprising a fluid source, a control valve configured to selectably apply pressurized control fluid from the fluid source to an extension side and a retraction side of the first linear actuator, and a diverter valve configured to selectably provide direct fluid communication between the extension side and the retraction side of the first linear actuator via the diverter valve and thereby bypassing the control valve and the fluid source.

15. The apparatus of claim 14, wherein the control system comprises a control panel comprising:
- a first control valve controller configured to selectably open a first port of the control valve to supply the pressurized control fluid from the fluid source to the extension side of the first linear actuator, and to selectably open a second port of the control valve to supply the pressurized control fluid from the fluid source to the retraction side of the first linear actuator; and
- a diverter controller configured to selectably open a first pair of ports of the diverter valve that are configured to provide direct fluid communication between the extension side and the retraction side of the first linear actuator bypassing the control valve and the fluid source.

16. The apparatus of claim 15, wherein the articulated arm assembly comprises:
- a first arm pivotably coupled to a mount of a chassis of the apparatus at a first pivot joint;
- a second pivot arm pivotably coupled to the first pivot arm at a second pivot joint that is separate from the first pivot joint; and
- a third pivot arm pivotably coupled to the second pivot arm at a third pivot joint that is separate from the first pivot joint and the second pivot joint.

17. The apparatus of claim 16, wherein the articulated arm assembly comprises:
- a second linear actuator comprising a first end pivotably coupled to the second arm and a second end pivotably coupled to the first arm; and
- a third linear actuator comprising a first end pivotably coupled to the third arm and a second end pivotably coupled to the second arm;
- wherein the first linear actuator comprises a first end pivotably coupled to the first arm and a second end pivotably coupled to the mount.

18. The apparatus of claim 17, wherein the diverter valve is configured to selectably provide direct fluid communication between an extension side and a retraction side of the third linear actuator bypassing the control valve and the fluid source.

19. The apparatus of claim 18, wherein the diverter controller is configured to selectably open a second pair of ports of the diverter valve that are configured to provide direct fluid communication between the extension side and the retraction side of the third linear actuator bypassing the control valve the fluid source.

20. The apparatus of claim 14, wherein the control system further comprises a drill valve configured to selectably provide the drill with pressurized control fluid from the fluid source.

21. The apparatus of claim 20, wherein the fluid source comprises a first fluid discharge configured to provide a first fluid flowrate to the control valve and a second fluid discharge configured to provide a second flowrate that is different from the first fluid flowrate to the drill valve.

22. The apparatus of claim 14, wherein:
- the articulated arm assembly comprises a second linear actuator coupled to the first linear actuator; and
- the control system is configured to operate both the first linear actuator and the second linear actuator in a free-floating mode whereby an installation angle between the drill and the earthen surface is automatically maintained in response to the helical member being drilled into the earthen surface.

* * * * *